(12) United States Patent
Debie et al.

(10) Patent No.: US 11,378,536 B2
(45) Date of Patent: Jul. 5, 2022

(54) METHOD FOR PRODUCING A NANOFILM, SENSOR ARRANGEMENT COMPRISING A NANOFILM, AND NANOSIEVE COMPRISING A NANOFILM

(71) Applicant: Infineon Technologies AG, Neubiberg (DE)

(72) Inventors: Derek Debie, Bogen (DE); Alexander Zoepfl, Regensburg (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 356 days.

(21) Appl. No.: 16/433,289

(22) Filed: Jun. 6, 2019

(65) Prior Publication Data
US 2019/0376918 A1 Dec. 12, 2019

(30) Foreign Application Priority Data

Jun. 7, 2018 (DE) .......................... 102018209083.1

(51) Int. Cl.
| | |
|---|---|
| *G01N 27/12* | (2006.01) |
| *G01N 27/22* | (2006.01) |
| *B05D 7/22* | (2006.01) |
| *B05D 3/12* | (2006.01) |
| *B82Y 40/00* | (2011.01) |

(52) U.S. Cl.
CPC ............. *G01N 27/127* (2013.01); *B05D 3/12* (2013.01); *B05D 7/22* (2013.01); *B82Y 40/00* (2013.01); *G01N 27/227* (2013.01)

(58) Field of Classification Search
CPC ...... G01N 27/127; G01N 27/227; B05D 7/22; B05D 3/12; B01D 67/0032; B01D 67/0034; B01D 67/0083; B01D 67/009; B01D 67/0006; B01D 2323/24; B01D 2323/40; B01D 2323/345; B01D 2325/028; B01L 3/502707
See application file for complete search history.

(56) References Cited

U.S. PATENT DOCUMENTS

| | | | |
|---|---|---|---|
| 2011/0197657 A1* | 8/2011 | Gole | .................... G01N 27/127 73/31.05 |
| 2012/0103821 A1 | 5/2012 | Harrer et al. | |

(Continued)

FOREIGN PATENT DOCUMENTS

| | | |
|---|---|---|
| DE | 10201640 A1 | 8/2003 |
| DE | 102010001504 A1 | 8/2011 |
| DE | 112011103053 B4 | 6/2018 |

*Primary Examiner* — Judy Nguyen
*Assistant Examiner* — Joseph O Nyamogo
(74) *Attorney, Agent, or Firm* — Slater Matsil, LLP (57) ABSTRACT

A method for producing a nanofilm includes providing a microsieve having a first and a second opposite surface region, wherein micropores are formed between the first and second surface regions; applying a nanomaterial suspension on the first surface region of the microsieve, wherein the nanomaterial suspension comprises nanomaterial particles; and creating a pressure difference at a plurality of the micropores between the first and second surface region of the microsieve in order to move the nanomaterial suspension into the micropores and/or through the micropores, such that the nanomaterial particles adhere to the first surface region and to the wall regions of the micropores and form the nanofilm.

18 Claims, 6 Drawing Sheets

(56) References Cited

U.S. PATENT DOCUMENTS

| | | | | |
|---|---|---|---|---|
| 2012/0301953 A1* | 11/2012 | Duan | ............... | G01N 27/4146 435/287.9 |
| 2018/0021736 A1* | 1/2018 | Fonash | ............ | B01D 67/0034 210/348 |
| 2018/0296982 A1* | 10/2018 | Li | .................... | B01D 67/0034 |

* cited by examiner

$R_{250}$ = linear behavior → ohmic contact

METHOD FOR PRODUCING A NANOFILM, SENSOR ARRANGEMENT COMPRISING A NANOFILM, AND NANOSIEVE COMPRISING A NANOFILM

This application claims the benefit of German Application No. 102018209083.1, filed on Jun. 7, 2018, which application is hereby incorporated herein by reference.

TECHNICAL FIELD

Exemplary embodiments relate to a method for producing a nanofilm, to a sensor arrangement comprising a nanofilm as sensor element, and furthermore to a nanosieve comprising a nanofilm. In particular, exemplary embodiments relate to a method for producing self-supporting nanofilms by creating a pressure difference, and furthermore to a self-supporting nanofilm for sensor applications.

BACKGROUND

Attempts are currently being made to form homogeneous, thin layers by precisely applying ink having nanomaterial particles dissolved therein and subsequently evaporating the ink base material. However, this production of homogeneous, thin layers often gives rise to a disturbing effect, referred to as coffee rim or coffee ring effect, which brings about a non-uniform distribution of the solid particles which are dissolved in the ink and which are intended to form the thinnest possible homogeneous layer. If the solid particles are formed in a conductive fashion, for example, wherein a uniform conductive layer having a uniform conductivity distribution is intended to be formed, inhomogeneous regions having a varying conductivity arise, however, as a result of the coffee rim effect on account of the conductive particles that have accumulated there. As a result, upon an energization of the resulting conductive coating, it is not possible to obtain a homogeneous current distribution in the resulting layer.

A so-called "coffee ring" arises because the edges of the applied ink material remain stable even during the evaporation of the liquid portion of the ink material. As the volume of the liquid of the ink decreases as a result of evaporation, ink (liquid) continues to flow from the center to the edges, such that dissolved particles in the ink are moved from the center to the edge, and gradually accumulate there. Once the ink has then been completely evaporated, a ring-shaped, undesired configuration of the remaining particles is formed as a result of the particles dissolved in the ink.

This coffee ring effect arises for example in types of application by so-called "microapplying" (microdispensing) or by inkjet printing.

SUMMARY

In the field of producing thin layers that are as homogeneous as possible, there is a need for reliable and readily reproducible procedures for producing such thin layers, such as e.g. homogeneous thin nanolayers or nanofilms, which can for example also be used for sensor arrangements or filtration applications.

Such a need can be met by the subject matter of the present independent patent claims. Developments of the present concept are defined in the dependent claims.

In accordance with one exemplary embodiment, a method for producing a nanofilm comprises the following steps: providing a microsieve having a first and a second opposite surface region, wherein micropores are formed between the first and second surface regions; applying a nanomaterial suspension on the first surface region of the microsieve, wherein the nanomaterial suspension comprises nanomaterial particles; and creating a pressure difference at a plurality of the micropores, e.g. between the first and second surface region of the microsieve in order to move the nanomaterial suspension into the micropores and/or through the micropores, such that the nanomaterial particles adhere to the first surface region and to the wall regions of the micropores and form the nanofilm.

In accordance with one exemplary embodiment, the step of creating a pressure difference involves exerting a reduced pressure on a plurality of the micropores at the second surface region of the microsieve in order to draw the nanomaterial suspension into the micropores and/or through the micropores, such that the nanomaterial particles adhere to the first surface region and to wall regions of the micropores and form the nanofilm.

In accordance with one exemplary embodiment, the step of creating a pressure difference involves exerting an excess pressure on a plurality of the micropores at the first surface region of the microsieve in order to press the nanomaterial suspension into the micropores and/or through the micropores, such that the nanomaterial particles adhere to the first surface region and to wall regions of the micropores and form the nanofilm.

In accordance with one exemplary embodiment, the nanofilm is produced in accordance with the method as claimed in any of the preceding patent claims, wherein the nanofilm is formed for detecting a measurement variable.

In accordance with one exemplary embodiment, the nanofilm is formed in an electrically conductive fashion and an at least regional deformation of the nanofilm brings about a change in an electrical property, such as the conductivity, of the nanofilm.

In accordance with one exemplary embodiment, the nanofilm is formed to adsorb a target substance or a target gas, wherein a change in an electrical property of the nanofilm is brought about in the event of the target substance or target gas binding to the nanofilm.

In accordance with one exemplary embodiment, a nanosieve comprises a nanofilm, wherein the nanofilm is produced in accordance with the above method, wherein the nanofilm has nanopores in the regions spanning the webs, in order to form a nanosieve.

BRIEF DESCRIPTION OF THE DRAWINGS

Exemplary embodiments of devices and/or methods are described in greater detail below by way of example with reference to the accompanying figures and drawings, in which.

DETAILED DESCRIPTION OF ILLUSTRATIVE EMBODIMENTS

Before exemplary embodiments are explained more specifically in detail below with reference to figures, it is pointed out that identical, functionally identical or identically acting elements, objects, function blocks and/or method steps are provided with the same reference signs in the various figures, such that the description of said elements, objects, function blocks and/or method steps that is presented in the various exemplary embodiments is mutually interchangeable or can be applied to one another.

Various exemplary embodiments will now be described thoroughly with reference to the accompanying figures. In the figures, the thicknesses of lines, layers and/or regions may be illustrated in a manner not to scale for elucidation purposes.

A basic flow diagram of the method steps of a method 100 for producing a nanofilm 250 in accordance with one exemplary embodiment will now be described below with reference to FIG. 1a.

Firstly, in step no, a microsieve 210 having a first and a second, opposite main surface region 210A, 210B is provided, wherein micropores or microopenings 212 are formed between the first and second main surface regions 210A, 210B of the microsieve 210.

The microsieve 210 can be formed for example as a substrate 214 having continuous micropores or microopenings 212 arranged therein. The substrate 214 can comprise for example a patternable semiconductor material, such as e.g. silicon, polysilicon, silicon nitride, silicon oxide or else combinations of these materials. Furthermore, any further materials are suitable which are correspondingly patternable, such as e.g. metals, metal oxides and/or ceramics, provided that these materials are suitable for producing a sieve structure therein.

The term micropores or microopenings 212 denotes through openings through the substrate 214 which are arranged adjacent to one another and which extend between the first and second, opposite main surface region 210A, 210B of the substrate 214. The length of the micropores or microopenings 212 corresponds to the substrate thickness $d_{214}$, while the diameter $d_{212}$ of the micropores or microopenings 212 can be in the micrometers range, for example.

In step 120, a nanomaterial suspension 300 is then applied on the first surface region 210A of the microsieve 210, wherein the nanomaterial suspension 300 comprises nanomaterial particles 310 in a liquid or a solvent 305. The nanomaterial particles 310 can be formed for example in a planar or "two-dimensional" fashion in the form of nanoplatelets or nanoflakes, for example, which comprise for example only one or a few atomic layers, e.g. between 1 and 100 atomic layers. The nanomaterial particles 310 often comprise a mixture of materials of different thicknesses, the thicknesses of which can, however, go down even to a single or a few atomic layers.

Figure 1A:
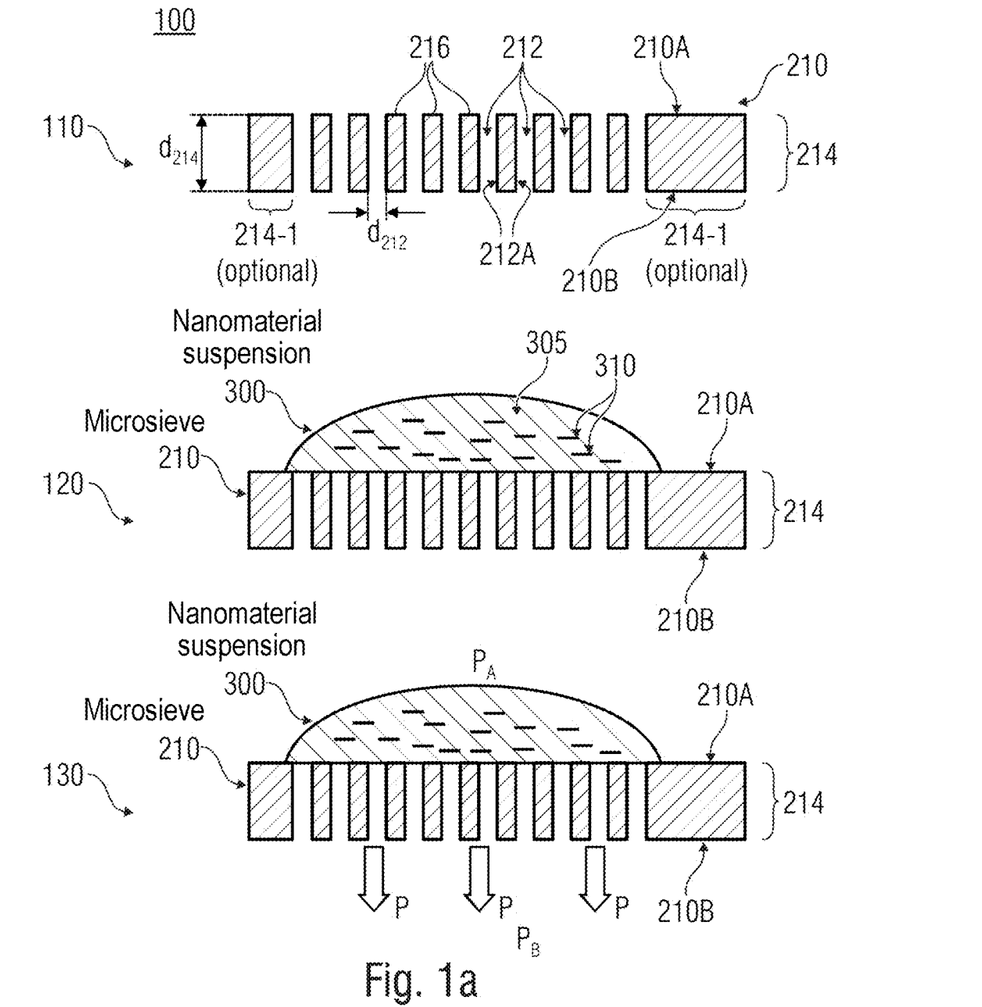
FIGS. 1a-1b show a basic flow diagram of the method steps of a method or process for producing a self-supporting nanofilm in accordance with one exemplary embodiment.
Figure 1B:
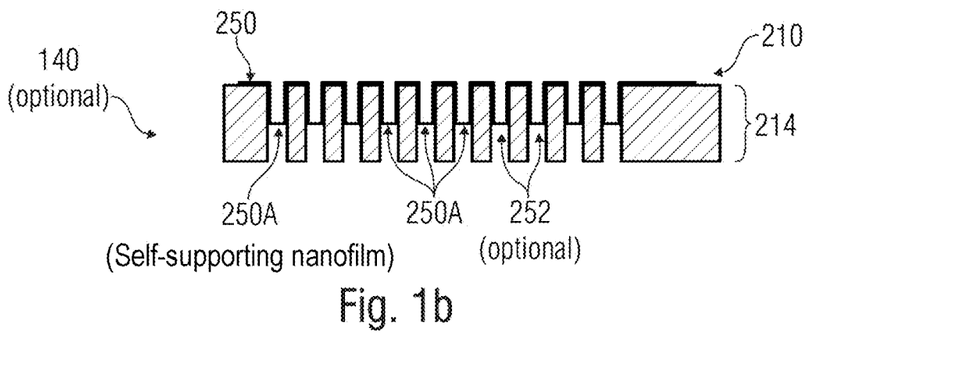

In step 130, between the first and second main surface regions 210A, 210B of the microsieve 210, a pressure difference P is then exerted on at least a plurality of the micropores 212 or on all the micropores 212 of the microsieve, in order to move or to bring the nanomaterial suspension 300 into the micropores 212 and/or through the micropores 212, such that the nanomaterial particles 310 adhere to the first main surface region 210A and e.g. regionally to the wall regions 212A of the micropores 212 and form the nanofilm 250 (see FIG. 1b).

The pressure difference P thus denotes a pressure difference P=PA−PB between the instantaneous ambient pressure (e.g. gas pressure) PB of the ambient atmosphere at the second main surface region 210B of the microsieve 210 and the instantaneous ambient pressure (e.g. gas pressure) PA of the ambient atmosphere at the first main surface region 210A of the microsieve 210.

In step 130, as is illustrated by way of example in FIG. 1a, the instantaneous atmospheric ambient pressure PB present at the second main surface region 210B of the microsieve 210 is thus lower than the instantaneous atmospheric ambient pressure PA present at the first main surface region 210A of the microsieve 210.

In accordance with one exemplary embodiment, therefore, step 130 of creating a pressure difference involves exerting a reduced pressure on a plurality of the micropores 212 at the second surface region 210B of the microsieve 210 in order to draw the nanomaterial suspension 300 into the micropores 212 and/or through the micropores 212, such that the nanomaterial particles 310 adhere to the first surface region 210A and to wall regions 212A of the micropores 212 and form the nanofilm 250. The pressure difference P can be achieved, for example, by setting the instantaneous ambient pressure PA at the first main surface region 210A of the microsieve 210 to atmospheric pressure (approximately 1 bar), for example, while the instantaneous ambient pressure PB at the second main surface region 210B of the microsieve 210 is set to a reduced pressure of less than or equal to 0.5 bar or 0.1 bar.

In accordance with a further exemplary embodiment, step 130 of creating a pressure difference involves exerting an excess pressure on a plurality of the micropores 212 at the first surface region 210A of the microsieve 210 in order to press the nanomaterial suspension 300 into the micropores 212 and/or through the micropores 212, such that the nanomaterial particles 310 adhere to the first surface region 210A and to wall regions 212A of the micropores 212 and form the nanofilm 250. The pressure difference P can be achieved, for example, by setting the instantaneous ambient pressure PA at the first main surface region 210A of the microsieve 210 for example to an excess pressure of 1 to 2 bar relative to the instantaneous ambient pressure PB at the second main surface region 210B of the microsieve 210.

FIG. 1b illustrates the resulting, for example self-supporting, nanofilm 250 formed at the first main surface region 210A and at least regionally at the wall regions 212A of the micropores 212, i.e. at the wall regions 212A adjoining the surface regions 210A. In the exemplary embodiment illustrated in FIG. 1b, the nanofilm 250 within the micropores 212 spans said micropores 212. In this case, the nanofilm 250, in the sections 250A spanning the micropores 212, can be formed as impermeable or optionally also having further nanopores or nano-openings 252. The sections 250A of the nanofilm 250 that span the micropores 212 thus form the so-called self-supporting regions 250A of the nanofilm 250.

In accordance with exemplary embodiments, therefore, suspensions 300 can be applied on the microsieve 210 while a reduced pressure PB created on the underside 210B of the microsieve draws away the suspension 300 or the solvent 305 contained therein. The nanomaterial or the nanomaterial particles 310 contained in the nanomaterial suspension 300 remain on the microsieve 210, which is effective as a filter, and in the pores or micropores 212 arranged therein and form the nanofilm 250.

Thin nanofilms 250 can be produced over a large area by the targeted applying of nanomaterial suspensions 300 on the microsieve 210 and the separating of solvent 305 and nanomaterial 310, said separating being carried out by creating a pressure difference, e.g. by the process of extraction by suction (=step 130). The nanomaterial particles or nanomaterial platelets 310 can comprise carbon, for example, in order to form a conductive graphene nanofilm 250 or a conductive graphene membrane 250.

Nanomaterials for the nanomaterial particles or nanomaterial platelets 310 here can be any 2D layer materials or the suspensions thereof. Examples thereof are graphene, graphene oxide, molybdenum disulfide, boron nitride, etc., but also carbon nanotubes (CNTs).

Solvents used can correspondingly be such materials in which said nanomaterials can be suspended stably. In the case of graphene oxide as nanomaterial, the solvent used can be water, ethanol, isopropanol or ethylene glycol, for example. In the case of graphene and CNTs as nanomaterial, organic nonpolar solvents can be used, for example.

In accordance with one exemplary embodiment, the micropores 212 are mechanically connected to one another by webs 216 (also see FIG. 2b), wherein in step 130, by the pressure difference P, the nanomaterial suspension is moved or introduced into the micropores 212 that are mechanically connected to one another by the webs 216. In this case, the nanofilm 250 furthermore forms in the micropores 212 and in a manner spanning the micropores 212 between the webs 216 and on the webs 216 at the microsieve 210.

In step 130, in accordance with one exemplary embodiment, the pressure difference exerted on the second surface region 210B of the microsieve 210 can be exerted uniformly on a plurality of the micropores 212 or on all micropores 212 of the microsieve 210.

In accordance with a further exemplary embodiment, the pressure difference exerted on the second surface region 210B of the microsieve 210 can also be exerted nonuniformly over the second surface region 210B; i.e. at predefined micropores or at one or more predefined partial regions of the second main surface region 210B of the microsieve 210, the pressure difference is exerted in order to obtain only in this region or these regions the nanofilm 250 having the sections 250A of the nanofilm 250 that span the webs 216 within the micropores 212 of the microsieve 210.

In accordance with one exemplary embodiment, it is then possible, in an optional step 140 of FIG. 1b, to heat the microsieve 210 and the e.g. continuous material of the nanofilm 250 adhering to the microsieve 210, in order "to densify" the nanofilm 250 and/or furthermore to remove a residual solvent of the nanomaterial suspension 300 used. Mechanical and/or electrical properties, e.g. the mechanical stability 250 and/or the layer conductivity of the nanofilm 250, can be increased by the step of heating and the resultant densifying of the material of the nanofilm 250.

In accordance with one exemplary embodiment, the microsieve 210 can comprise a substrate 214 having the micropores or microopenings 212 arranged therein, wherein the micropores 212 are mechanically connected to one another by the webs 216, for example. The webs 216 furthermore yield a mechanical connection to the frame structure 214-1 of the microsieve 210 surrounding the micropores 212. In accordance with one exemplary embodiment, the substrate 214 can be formed as a semiconductor substrate or semiconductor wafer, e.g. a silicon wafer, such that the microsieve 210 having the micropores 212 can be integrated into a semiconductor wafer in order to produce the nanofilm 250 for example during the production method or production process 100 at the wafer level.

In accordance with one exemplary embodiment, the micropores 212 of the microsieve 210 have for example a pore length $d_{214}$ (=substrate diameter) of, for example, 200 to 2000 nm, or of 300 to 1000 nm or of approximately 600 nm and furthermore have a pore diameter or a pore width $d_{212}$ (=clear width of the micropores 212) of approximately 0.1 to 20 μm or of 5 to 10 μm or of approximately 6 μm. In this case, the nanomaterial particles 310 in the nanomaterial suspension 300 can have for example an average lateral extent of 0.1 to 50 μm.

The above dimensions should be assumed to be merely by way of example, since the present concept is scalable to larger and also to smaller structures of the microsieve 210 with a corresponding adaptation of the size of the nanomaterial particles 310 used.

In accordance with one exemplary embodiment, the micropores 212 are mechanically connected to one another by the webs 216, wherein in step 130 the nanofilm 250 is formed in the micropores 212 and in a manner spanning the micropores 212 between the webs 216 and on the webs 216 at the microsieve 210. Furthermore, nanopores or nano-openings 252 can be formed in the sections 250A of the nanofilm 250 that span the micropores 212. The nanofilm 250 with the optional nanopores 252 arranged therein can thus be formed as a nanosieve.

In accordance with one exemplary embodiment, the nanofilm 250 formed as a nanosieve can furthermore have the optional nano-openings 252 by virtue of the nanofilm 250 being formed at the webs 216 and furthermore at the wall regions 212A of the pores 212, wherein substantially no sections 250A of the nanofilm 250 spanning the webs 216 are formed.

In accordance with one exemplary embodiment, the nanofilm 250 can be produced as a sensor element of a sensor arrangement (not shown in FIGS. 1a-1b), wherein the nanofilm 250 can be formed for detecting a measurement variable. In this regard, the nanofilm 250 can be formed in an electrically conductive fashion, wherein an at least regional deformation of the nanofilm 250 brings about a change in the electrical properties such as e.g. the conductivity and/or the sheet resistance of the nanofilm 250.

In accordance with one exemplary embodiment, the nanofilm 250 can be formed in a manner spanning the micropores 212 between the webs 216 at the microsieve 210, wherein a deflection of at least one region of the microsieve 210 with the region of the nanofilm 250 arranged thereon brings about a detectable change in the conductivity and/or change in the sheet resistance of the nanofilm 250.

In accordance with one exemplary embodiment, the nanofilm 250 or the sections 250A of the nanofilm can be formed as a "honeycomb array" in a manner spanning the micropores between the webs 216 at the microsieve 210, wherein a deflection of one or more nanofilm honeycombs 250A of the honeycomb array brings about a detectable change in the conductivity of the nanofilm 250.

The material of the nanofilm 250 can furthermore be formed to bind a target substance or a target gas of the ambient atmosphere, i.e. a solid, liquid and/or gaseous constituent of the ambient atmosphere, wherein a change in the electrical property of the nanofilm 250 is brought about in the event of the binding (i.e. physisorption and/or chemisorption) of the target substance or the target gas to the nanofilm 250 and is correspondingly able to be read out.

Furthermore, the nanofilm 250 arranged at the microsieve 210 can form a nanosieve by the nanofilm being formed at the webs 216 and furthermore at the wall regions 212A of the micropores 212.

In accordance with one exemplary embodiment, the nanofilm 250 formed at the microsieve 210 can furthermore form a nanosieve, wherein the nanofilm is formed in the micropores 212 of the microsieve 210 and in a manner spanning the micropores 212 between the webs 216, and furthermore has nanopores 252 for example in the spanning region 250A of the nanofilm 250 itself.

Figure 2A:
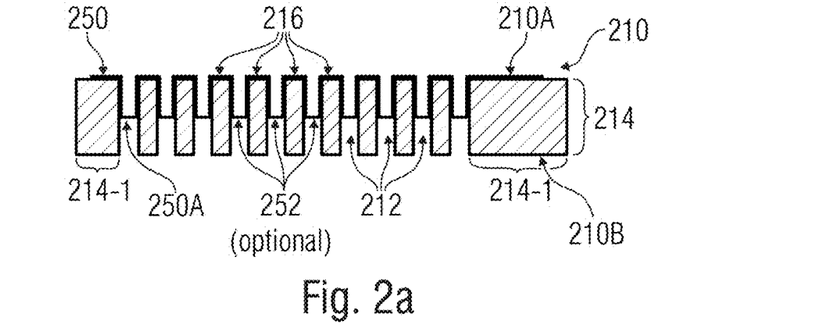
FIG. 2a shows a basic cross-sectional view of a nanofilm formed at a microsieve in accordance with one exemplary embodiment.

FIG. 2a then illustrates once again a basic cross-sectional view of a nanofilm 250 formed at the microsieve 212, i.e. the substrate 214 having the microopenings 212, in accordance with one exemplary embodiment. In the exemplary embodiment illustrated in FIG. 2a, the nanofilm 250 is formed regionally in the micropores 212 and furthermore in a manner spanning the micropores 212 between the webs 216 (=sections 250A) and on the webs 216 at the microsieve 210.

Figure 2B:
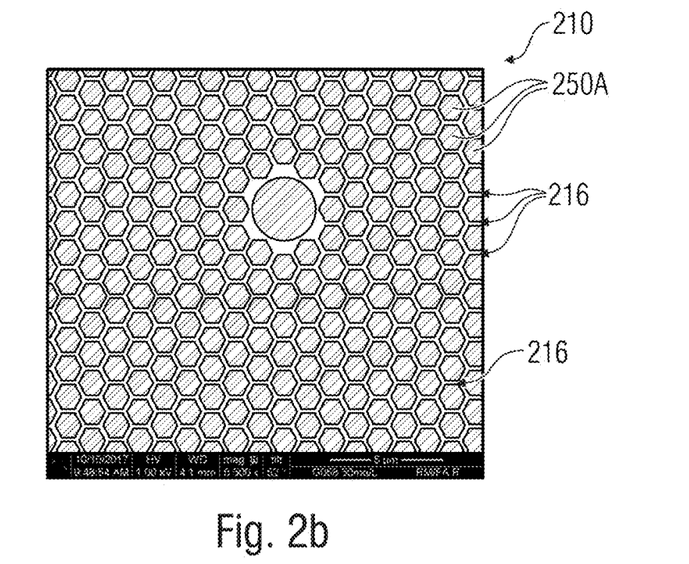
FIGS. 2b-2d show detail illustrations of the nanofilm formed at the microsieve in a plan view and in further detail sectional views in accordance with one exemplary embodiment.

FIG. 2b then shows an exemplary plan view of a region of the microsieve 210 with the nanofilm 250 illustrated schematically in FIG. 2a. As is illustrated in FIG. 2b, the microsieve 210 is formed as a so-called "honeycomb array", wherein the webs 216 surround the honeycomb-shaped micropores 212 and mechanically connect them to one another.

As is illustrated by way of example in FIG. 2b, the micropores 212 are formed in a hexagonal fashion and symmetrically in cross section, wherein this configuration should be assumed to be merely by way of example. The contour line of the micropores 212 can assume a substantially arbitrary form of a polynomial progression, but for reasons of space utilization and/or stability reasons symmetrical configurations of the cross section of the micropores 212 can be used, e.g. in the form of regularly convex polygons, in order to obtain a symmetrical honeycomb-shaped configuration of the resulting microsieve 210 having the largest possible surface area ratio of the self-supporting nanofilm sections 250A spanning the micropores 212 relative to the surface area of the webs 216. In this regard, by way of example, in the case of a sensor arrangement using the nanofilm 250, on account of the relatively large effective area of the nanofilm 250, it is possible to obtain a relatively large readable sensor signal of the nanofilm 250 formed as a sensor element.

Figure 2C:
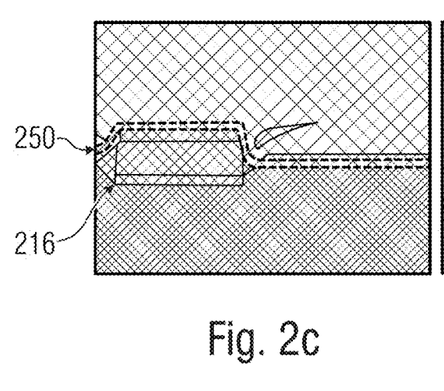

FIG. 2C then illustrates the nanofilm 250 formed at the microsieve 210 in a detail cross-sectional view. The sectional view in FIG. 2C is taken through a web 216 of the microsieve 210, wherein, in order to clarify the nanofilm 250 formed, the latter is emphasized by dashed boundary lines that are additionally depicted. As is evident from FIG. 2c, the nanofilm 250 extends extremely uniformly between adjacent webs 216 of the microsieve 210.

Figure 2D:
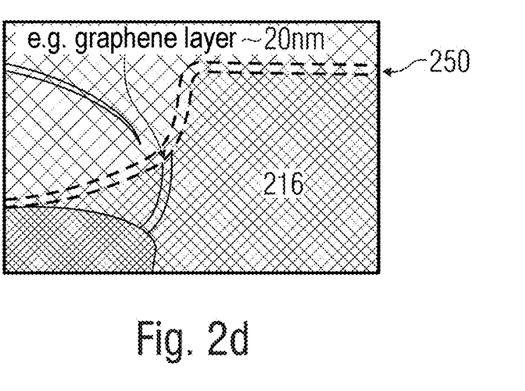

FIG. 2d then furthermore shows a further detail illustration of the nanofilm 250 formed at the microsieve 210 in a further illustration—enlarged further (relative to the illustration in FIG. 2c)—of a web 216 and of the nanofilm 250 arranged thereon. As is illustrated in FIG. 2d, the nanofilm 250 can be formed for example as an approximately 20 nm thick graphene layer.

As has been explained above, it is also possible, of course, to use other materials for the nanofilm 250, wherein further varying layer thicknesses can also be obtained depending on the nanomaterial particles 310 used.

Figure 3A:
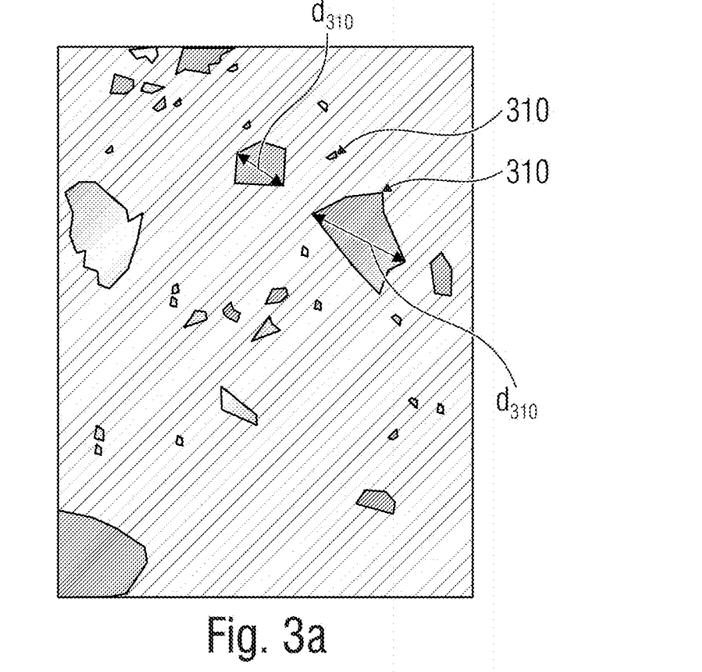
FIGS. 3a-3b show basic detail illustrations of nanomaterial, in accordance with one exemplary embodiment.
Figure 3B:
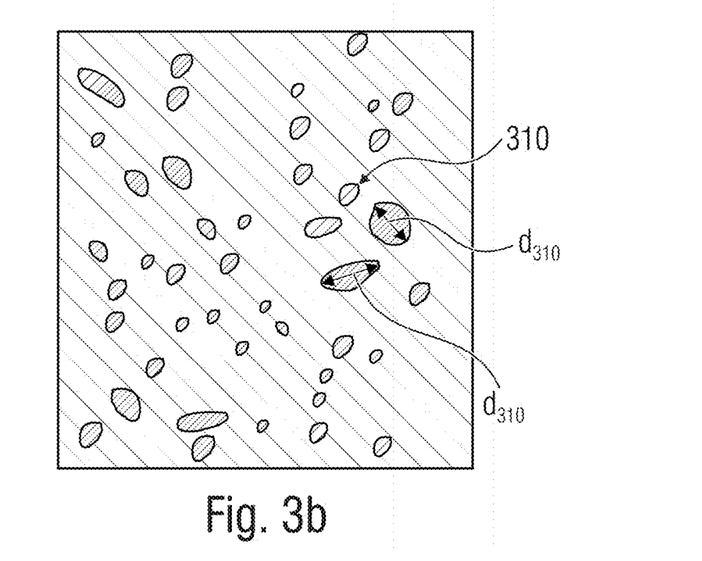

FIG. 3a-3b illustrate, as basic detail illustrations, nanomaterial particles 310, e.g. as nanomaterial platelets or nanomaterial flakes dried for example on a smooth substrate surface.

The so-called 2D material (nanomaterial) 310 has corresponding dimensions or lateral (planar) dimensions $d_{310}$, such that this 2D material (=nanomaterial or nanomaterial particles) 310 then remains or is retained in the sieve structure or the microsieve 210 during step 130 of exerting a pressure difference P. With regard to the nanomaterial particles (2D material) 310, it is possible to use for example flake size distributions (=nanomaterial particle sizes) $d_{310}$ of 100 nm to 50 μm given an exemplary sieve hole diameter $d_{212}$ of e.g. approximately 0.1 to 20 μm or of 5 to 10 μm or of approximately 6 μm. However, the above dimensions should be regarded as merely by way of example and applicable to one possible embodiment.

A basic cross-sectional view of a sensor arrangement 200 having a sensor element 260 comprising a conductive nanofilm 250 in accordance with one exemplary embodiment, will now be explained below with reference to FIG. 4.

Figure 4:
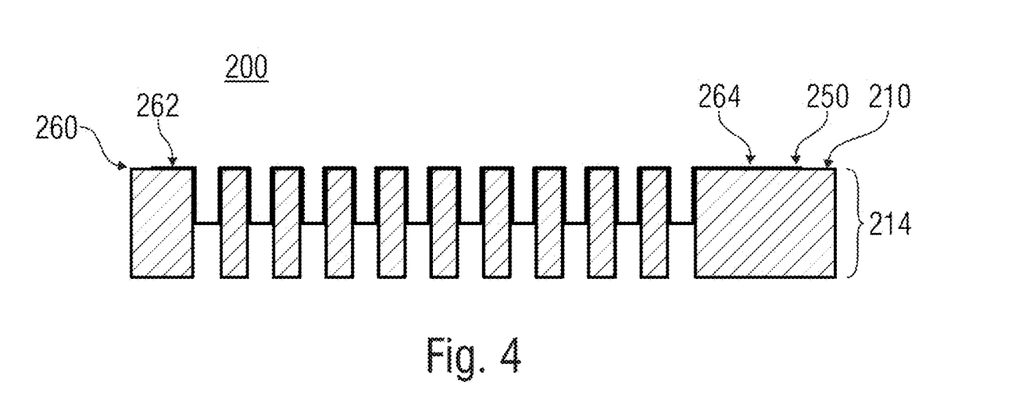
FIG. 4 shows a basic cross-sectional view of a sensor arrangement having a sensor element comprising a nanofilm in accordance with one exemplary embodiment.

As is illustrated in FIG. 4, by way of example at opposite edge regions of the optional frame structure 214-1 of the microsieve or of the sieve structure 210, electrical contact regions 262, 264 are arranged at the conductive nanofilm 250 and are electrically connected thereto in order to detect a measurement signal, e.g. on the basis of e.g. a change in the conductivity and/or sheet resistance of the nanofilm 250, wherein the electrical property of the nanofilm 250 is dependent on a measurement variable to be detected, e.g. a mechanical deformation of the nanofilm 250. In this regard, an at least regional deformation of the nanofilm 250 can bring about a change in the conductivity and/or the sheet resistance of the nanofilm 250.

By the nanofilm 250, which is arranged for example over the sieve structure 210 in a manner corresponding to a honeycomb array, it is possible to detect e.g. a deflection of the entire arrangement (of the honeycomb array) or of the microsieve 210 with the nanofilm 250 arranged thereon. Furthermore, it is also possible to detect the deflection of a single honeycomb or a plurality (e.g. a group) of honeycombs of the microsieve 210 with the nanofilm 250 arranged thereon by way of a change in the sheet resistance and/or else a change in the capacitance (relative to a reference electrode—not shown) of the nanofilm 250.

The material of the nanofilm 250 can furthermore be formed to bind a target substance or a target gas in the ambient atmosphere, i.e. a solid, liquid and/or gaseous constituent of the ambient atmosphere, wherein a change in the electrical property of the nanofilm 250 is brought about in the event of the binding, i.e. the chemical coupling, of the target substance or the target gas to the nanofilm 250 and is correspondingly able to be read out.

The sensor arrangement 200 can thus also be used as a chemical sensor, wherein the nanofilm 250, e.g. a graphene film, exhibits an evaluatable electrical interaction, e.g. in the form of a change in resistance or conductivity or a capacitive change, in the event of the binding of a target substance to the nanofilm 250. The target substance can be for example a solid, liquid and/or gaseous constituent of the ambient atmosphere or generally of a measurement fluid. Since the nanofilm 250 is arranged at the microsieve 210, the measurement fluid can dock to the nanofilm 250 on both sides or else penetrate through the nanofilm 250, provided that nanopores 252 are present, i.e. the nanofilm or the membrane 250.

Figure 5:
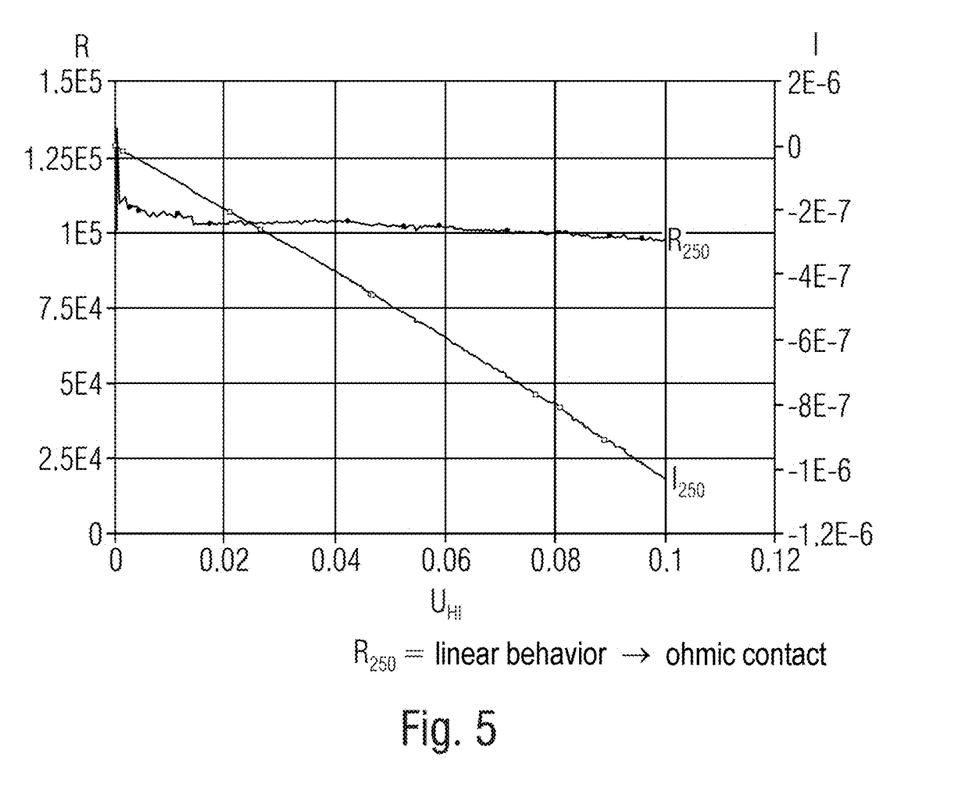
FIG. 5 shows a graphical illustration of an exemplary resistance profile of the sensor element versus an applied control signal.

With regard to the suitability of the conductive nanofilm 250 as a sensor element, reference is made for example to the graphical illustration of an exemplary resistance profile of the sensor element 260 versus an applied control signal UHI, as illustrated in FIG. 5. As is evident from FIG. 5, the conductive nanofilm 250 obtained has a linear ohmic behavior (of an ohmic contact), i.e. the sheet resistance value $R_{250}$ is within the relevant operating range substantially independently of the control signal applied to the conductive nanofilm 250, e.g. the control voltage UHI, thus resulting in the substantially linear profile of the impressed current $I_{250}$ in the conductive nanofilm 250.

Figure 6:
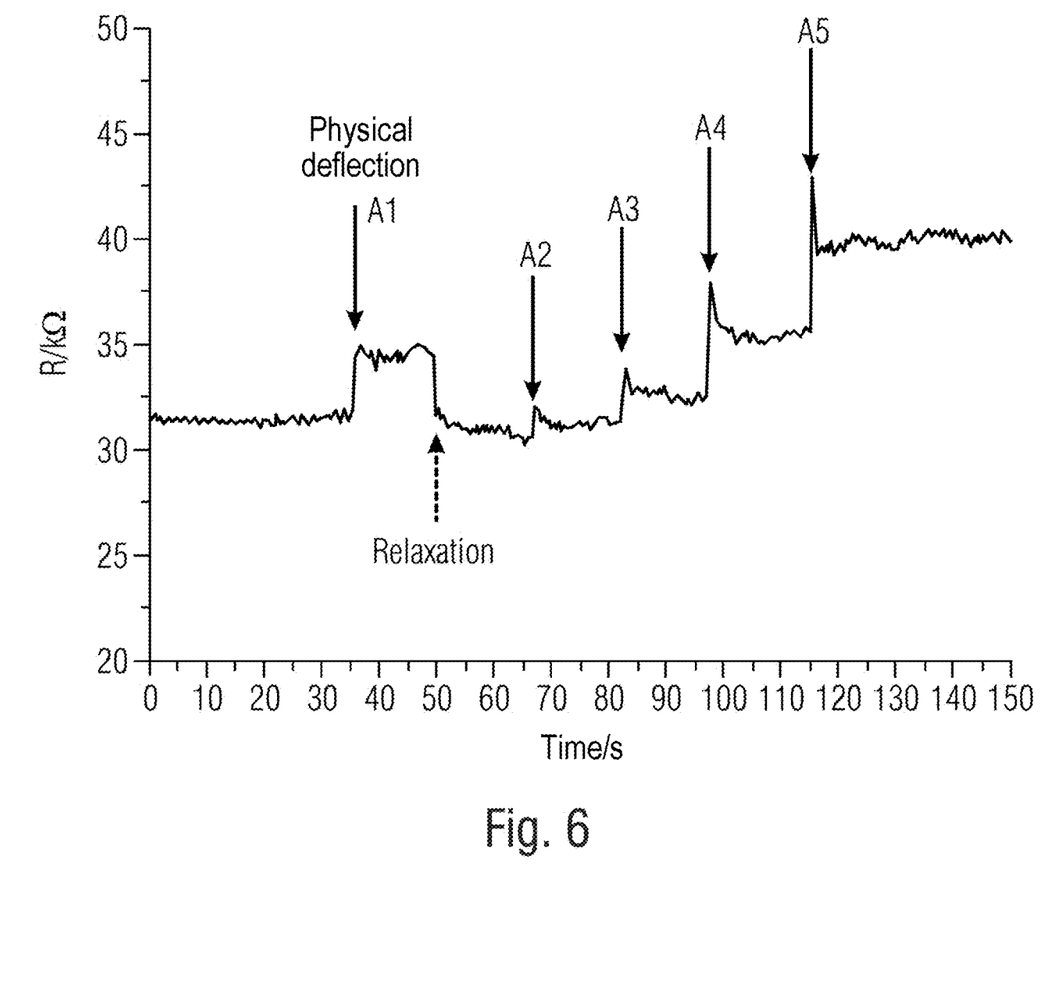
FIG. 6 shows a graphical illustration of an exemplary resistance profile of the sensor element in the case of deformation-dictated changes in the resistance value over time for the sensor element comprising a nanofilm in accordance with one exemplary embodiment.

FIG. 6 shows a graphical illustration of an exemplary resistance profile of the sensor element 216 with changes in the sheet resistance value $R_{250}$ of the nanofilm 250 over time, wherein the changes in the sheet resistance value $R_{250}$ of the nanofilm 250 are caused by mechanical deformations, e.g. by mechanical pressure or tension. As is evident from FIG. 6, changes in the sheet resistance value $R_{250}$ of the nanofilm (or of the membrane) 250 result in response to a physical deflection of the microsieve 210 or of regions of the microsieve 210. As is evident from FIG. 6, a sheet resistance change $\Delta R_{250}$ in the sheet resistance $R_{250}$ of the conductive nanofilm 250 results as a reaction to a physical deflection of the conductive nanofilm 250 arranged at the microsieve 210. The points in time of these mechanical or physical deflections of the conductive nanofilm 250 are identified by A1 to A5 in FIG. 6. Upon a return (=relaxation) of the conductive nanofilm 250 after a deflection back to the initial state, the resistance value $R_{250}$ of the conductive nanofilm 250 also exhibits a "resetting" or decrease of the resistance value $R_{250}$ that was increased by the mechanical deflection. Since the resistance change $\Delta R_{250}$ of the conductive nanofilm 250 is proportional to the mechanical deflection and thus e.g. to the pressure acting, quantitative statements about the amplitude of the pressure change can also be made using the sensor arrangement 200. The sensor arrangement 200 is thus usable for example as a relative pressure measuring device and as an absolute pressure measuring device.

Figure 7:
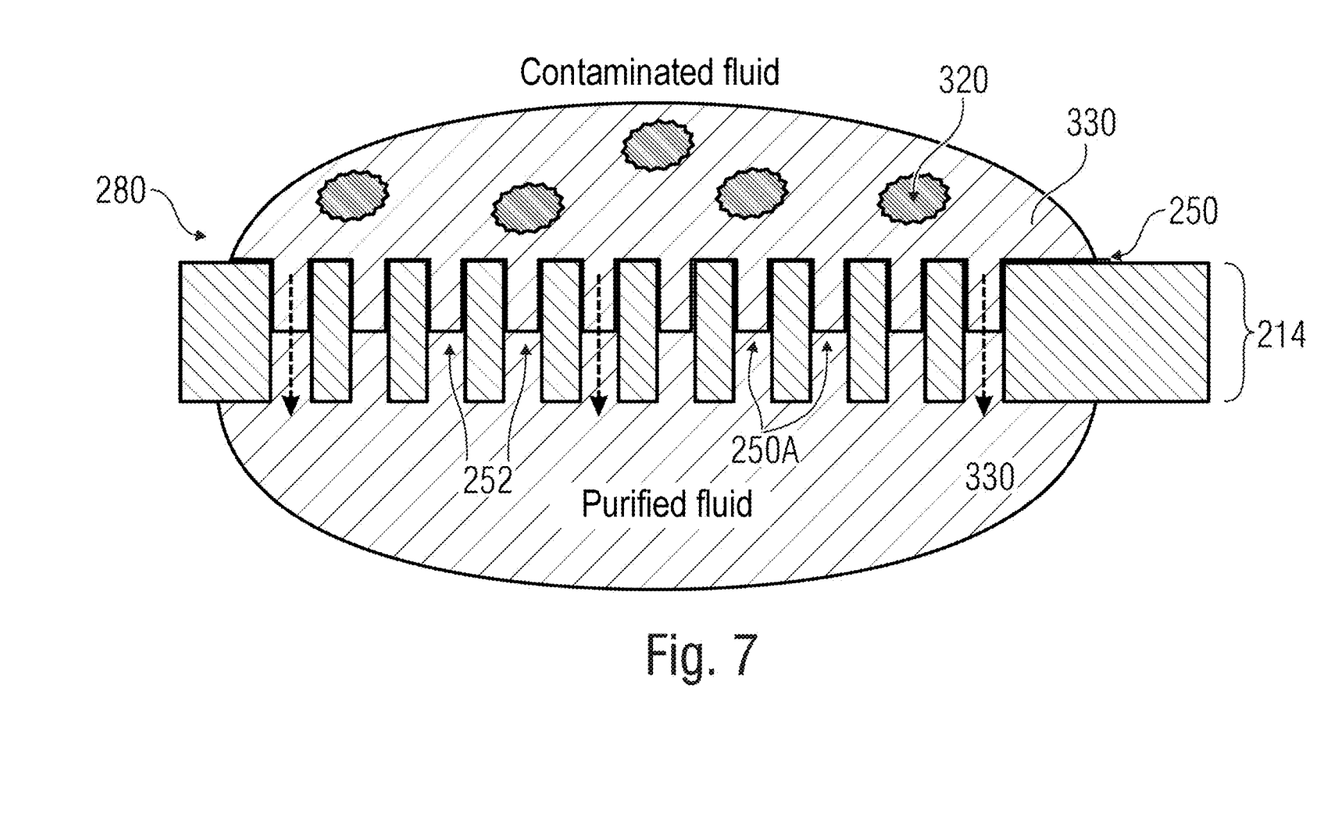
FIG. 7 shows a basic cross-sectional view of a nanosieve comprising a nanofilm formed at a microsieve in accordance with one exemplary embodiment.

FIG. 7 then shows, in a basic cross-sectional view, a nanosieve 280, with the nanofilm 250 arranged from the microsieve 210, in accordance with an exemplary embodiment. In this regard, nanopores or nano-openings 252 can be formed in the sections 250A of the nanofilm 250 that span the micropores 212. The nanofilm 250 with the optional nanopores 252 arranged therein can thus be formed as a nanosieve 280.

In accordance with the exemplary embodiment of the nanosieve 280 as illustrated in FIG. 7, so-called "nanopores" 252 can thus also be formed by the nanofilm 250 applied on the microsieve 210, such that a very fine-pored nanosieve 280 is formed from the original microsieve 210. A so-called "physical size exclusion" can thus be obtained by the nanosieve 280; i.e. sufficiently small particles of a fluid having a correspondingly small size, e.g. a molecular size, can penetrate through the nanosieve 280, while contamination particles 320 in the fluid 330, e.g. in a gas, in the ambient atmosphere or else in water, cannot penetrate through the nanosieve 280, with the result that a filtration application can be obtained by the nanosieve 280. In particular, contaminated water or else contaminated air can thus be filtered. The nanosieve 280 is thus suitable for filtration applications, e.g. for air or else water treatment.

Referring to FIGS. 1 to 7, some exemplary embodiments and their functionalities will now once again be summarized by way of example.

Nanoplatelets 310 (=nanoflakes) are suspended in a solvent in order to form the nanomaterial suspension 300. This suspension 300 is applied on a microsieve or nanosieve 210, wherein by a pressure difference P between the first and second surface regions 210A, 210B of the microsieve 210 (e.g. in the case of vacuum extraction by suction) from the opposite side 210B of the microsieve 210, the nanomaterial suspension 300 is moved through the openings 212 of the microsieve 210, e.g. sucked in at reduced pressure, and therefore passes through said openings.

It is equally possible, e.g. in the ambient atmosphere at the first surface region 210A of the microsieve 210, to create an excess pressure relative to the ambient atmosphere at the second surface region 210B of the microsieve 210 in order to press or move the nanomaterial suspension 300 by the excess pressure from the first side 210A of the microsieve 210 into the openings 212 of the microsieve 210, or therefore to cause said nanomaterial suspension to pass through said openings.

As the suspension 300 passes through the openings 212 of the microsieve 210, the nanomaterial platelets 310 situated or dissolved in the solvent then deposit on the webs 216 and wall regions 212A of the microsieve 210 and form a self-supporting nanofilm 250 that is as continuous as possible at the microsieve 210 and within the microsieve 210 over the openings 212. The nanofilm 250 can be e.g. a few atomic layers thick. Substantially "all" 2D materials can be used as nanomaterials. The nanolayer 250 has a diameter (=thickness $d_{250}$) of the order of magnitude of 20 nm, corresponding to approximately 100 atomic layers.

The nanoplatelets 310 are then formed with regard to their size (=lateral dimensions) so that, depending on the hole width $d_{212}$, the continuous nanofilm 250 is also formed within the openings 212 of the microsieve 210. A maximum uniformity of the nanofilm 250 is obtained by the respective process parameters and also by the respective design of the pores (microsieve openings) 212.

For the solvent of the nanomaterial suspension it holds true that a corresponding solvent is used depending on the property of the microsieve 210, i.e. hydrophilic or hydrophobic surface properties.

The pressure difference P created as uniformly as possible over the microsieve 210 is dependent e.g. on the following parameters: on the material of the nanoplatelets 310, the size and the design of the pores (microsieve holes) 212, and on the webs 216 of the microsieve 210 and the resultant mechanical stability of the microsieve 210. Moving (=step 130) the nanoplatelets 310 into or through the pores 212 of the microsieve 210 is possible by way of individual microsieve structures through to realization at the wafer level, i.e. of an entire wafer. The present production principle is applicable down to the wafer level, i.e. the present method is relatively extensively scalable relatively simply.

The nanofilm 250 obtained has e.g. a linear ohmic behavior, i.e. the sheet resistance is independent of the voltage applied to the nanofilm 250 (within the operating range).

The resulting graphene nanolayer 250 comprises individual carbon layers, for example, wherein optionally a densifying step (=step 140), e.g. a heating step, can be carried out as conclusion of the production process. In general, however, the molecular association of the nanoparticle platelets 310 is sufficient to form the continuous nanofilm 250.

For sensor applications, by the nanofilm 250 e.g. over the sieve structure 210 in a manner corresponding to a honeycomb array (cf. FIG. 2b), a deflection of the entire arrangement of the honeycomb array or of the microsieve 210 with the nanofilm 250 arranged thereon or else the deflection of an individual or a plurality of honeycombs 250A can be detected by way of a change in resistance.

For applications as a chemical sensor, the nanofilm 250, e.g. a graphene film, can exhibit an evaluatable electrical interaction with ΔR or ΔC in the event of the target substance, e.g. a target gas, binding to the nanolayer 250. Since the nanofilm 250 is arranged at the microsieve 210, the measurement fluid can dock to the nanofilm 250 or else penetrate through the membrane 250 on both sides.

Furthermore, so-called "nanopores" 252 can also be formed by the nanofilm 250 applied on the microsieve 210, such that a very fine-pored nanosieve 280 is formed from the "original microsieve" 210, with the result that a so-called "physical size exclusion" can be obtained by the nanosieve 280, i.e. nanoparticles having a correspondingly small size, e.g. a molecular size, can penetrate through the nanosieve 280.

In accordance with exemplary embodiments, it is thus possible to produce thin films or nanofilms 250 having a thickness of 20 nm on a relatively large area, e.g. on a semiconductor wafer having a diameter of 2, 4, 6, 8, 12 or 18 inches or more. In this case, an extremely homogeneous distribution or thickness of the resulting nanofilm 250 is attained, wherein in particular so-called "coffee rim problems" can be avoided.

Furthermore, a clear delimitation of the regions covered with the nanofilm 250 can be obtained by the sieve structure 210 (microsieve) formed in a substrate. Furthermore, it is possible to obtain a very large surface area as a result of the self-supporting membrane structure of the conductive nanofilm 250 at the carrying structure formed by the microsieve 210. Applications as pressure sensor, chemical sensors, filtration applications are possible as a result of the formation and production of the self-supporting membranes (nanofilms) 250. In the case of the application as pressure sensor, a change in an electrical property of the conductive nanomembrane 250 is detectable as a reaction to a physical deflection of said conductive nanomembrane. In the case of an application as chemical sensor, the nanofilm 250 is formed as a surface-active nanolayer, for example, wherein the accessibility from both sides of the nanofilm 250 arranged at the microsieve 210 makes it possible to achieve a substantially doubled effective surface area in comparison with conventional sensor elements.

In the case of application of the nanofilm 250 arranged at the microsieve 210, a high robustness of the resulting sensor arrangement can be achieved.

In the case of an application of the nanofilm 250 arranged at the microsieve 210 for chemically detecting constituents in the ambient atmosphere, an accessibility from both sides at the nanofilm 250 formed as a sensor element is achieved, such that it is possible to provide a large surface region for chemical detection. If nanopores 252 are furthermore provided in the nanofilm 250 formed at the microsieve 210, the arrangement can be used for filtration applications.

The self-supporting nanofilm 250 is thus accessible on both sides or thus obtains its active surface area in sensor applications. The nanofilm 250 makes the membrane more robust vis à vis deformations. A corresponding component comprising the nanofilm 250 arranged at the microsieve 210 can also be used as a floating membrane in pressure sensor/microphone applications as active sensor element.

In accordance with exemplary embodiments, the device construction of a sensor arrangement comprises an e.g. conductive nanofilm 250 at the microsieve 210, wherein an improvement in the sensor property and furthermore additional functionalities, such as e.g. filtration properties, can be obtained. In this regard, the nanofilm 250 produced on the microsieve 210 can serve as an active sensor element in MEMS applications (MEMS=microelectromechanical system), chemical sensors or as filter 280 having nanopores 252.

In accordance with one exemplary embodiment, a method 100 for producing a nanofilm 250 comprises the following steps: providing no a microsieve 210 having a first and a second opposite surface region 210A, 210B, wherein micropores 212 are formed between the first and second surface regions 210A, 210B; applying 120 a nanomaterial suspension 300 on the first surface region 210A of the microsieve 210, wherein the nanomaterial suspension 300 comprises nanomaterial particles 310; and creating a pressure difference at a plurality of the micropores 212 between the first and second surface region 210A, 210B of the microsieve 210 in order to move the nanomaterial suspension 300 into the micropores 212 and/or through the micropores 212, such that the nanomaterial particles 310 adhere to the first surface region 210A and to the wall regions 212A of the micropores 212 and form the nanofilm 250.

In accordance with one exemplary embodiment, the nanomaterial suspension 300 is moved by the pressure difference into the micropores 212, which are mechanically connected to one another by webs 216, in order to form the nanofilm 250 furthermore regionally in the micropores 212 and in a manner spanning the micropores 212 between the webs 216 and on the webs 216 at the microsieve 210.

In accordance with one exemplary embodiment, the pressure difference exerted on the second surface region 210B of the microsieve 210 is exerted uniformly on the plurality of micropores 212 of the microsieve 210.

In accordance with one exemplary embodiment, the nanomaterial suspension 300 comprises a solvent having the nanomaterial particles 310, wherein the method 100 furthermore comprises the following step: heating 140 the nanofilm 250 adhering to the microsieve 210 in order to densify the nanofilm and/or to remove residual solvent of the applied nanomaterial suspension 300.

In accordance with one exemplary embodiment, the microsieve 210 is formed as a substrate 214 having micropores 212 arranged therein, wherein the substrate 214 has an edge region 214-1 surrounding the micropores 212 formed in the substrate 214.

In accordance with one exemplary embodiment, the microsieve 210 is integrated in a semiconductor wafer in order to produce the nanofilm 250 at the wafer level.

In accordance with one exemplary embodiment, the microsieve 210 has a pore diameter $d_{212}$ of 5 to 10 µm and of approximately 6 µm and furthermore a pore length of 300 to 1000 nm and of approximately 600 nm, wherein the nanomaterial particles have an average lateral extent of 0.1 to 50 µm.

In accordance with one exemplary embodiment, the nanomaterial particles 310 are formed as nanomaterial platelets or nanomaterial flakes, wherein the nanomaterial particles 310 have an average lateral extent of 0.1 to 50 µm.

In accordance with one exemplary embodiment, the nanomaterial particles 310 comprise carbon in order to form a graphene nanofilm 250.

In accordance with one exemplary embodiment, the micropores 210 are mechanically connected to one another by webs 216, wherein the nanofilm 250 furthermore has nanopores 250 in regions 250A spanning the micropores, in order to form a nanosieve having the nanopores 252.

In accordance with one exemplary embodiment, step 130 of creating a pressure difference involves exerting a reduced pressure on a plurality of the micropores 212 at the second surface region 210B of the microsieve 210 in order to draw the nanomaterial suspension 300 into the micropores 212 and/or through the micropores 212, such that the nanomaterial particles 310 adhere to the first surface region 210A and to wall regions 212A of the micropores 212 and form the nanofilm 250.

In accordance with one exemplary embodiment, step 130 of creating a pressure difference involves exerting an excess pressure on a plurality of the micropores 212 at the first surface region 210A of the microsieve 210 in order to press the nanomaterial suspension 300 into the micropores 212 and/or through the micropores 212, such that the nanomaterial particles 310 adhere to the first surface region 210A and to wall regions 212A of the micropores 212 and form the nanofilm 250.

In accordance with one exemplary embodiment, the nanofilm 250 is produced in accordance with the method as claimed in any of the preceding patent claims, wherein the nanofilm 250 is formed for detecting a measurement variable.

In accordance with one exemplary embodiment, the nanofilm 250 is formed in an electrically conductive fashion and an at least regional deformation of the nanofilm 250 brings about a change in the conductivity of the nanofilm 250.

In accordance with one exemplary embodiment, the nanofilm 250 is arranged in a manner spanning the micropores 212 between the webs 216 at the microsieve 210, wherein a deflection $\Delta x$ of the microsieve 210 with the nanofilm 250 arranged thereon brings about a detectable change in the electrical properties such as e.g. the conductivity of the nanofilm 250.

In accordance with one exemplary embodiment, the micropores 212 are formed in a honeycomb-shaped fashion, wherein the nanofilm 250 is formed as a honeycomb array in a manner spanning the micropores 212 formed in a honeycomb-shaped fashion between the webs 216 at the microsieve 210, wherein a deflection of one or more nanofilm honeycombs 250A brings about a detectable change in the conductivity of the nanofilm 250.

In accordance with one exemplary embodiment, the nanofilm 250 is formed to adsorb a target substance or a target gas, wherein a change in an electrical property of the nanofilm 250 is brought about in the event of the target substance or target gas binding to the nanofilm 250.

In accordance with one exemplary embodiment, a nanosieve 280 comprises a nanofilm 250, wherein the nanofilm 250 is produced in accordance with the method 100, wherein the nanofilm 250 has nanopores 252 in the regions 250A spanning the webs 216, in order to form a nanosieve.

Although some aspects of the present disclosure have been described as features in the context of a device, it is clear that such a description can likewise be regarded as a description of corresponding method features. Although some aspects have been described as features in association with a method, it is clear that such a description can also be regarded as a description of corresponding features of a device or of the functionality of a device.

In the detailed description above, in some instances different features have been grouped together in examples in order to rationalize the disclosure. This type of disclosure ought not to be interpreted as the intention that the claimed examples have more features than are expressly indicated in each claim. Rather, as represented by the following claims, the subject matter can reside in fewer than all features of an individual example disclosed. Consequently, the claims that follow are hereby incorporated in the detailed description, wherein each claim can be representative of a dedicated separate example. While each claim can be representative of a dedicated separate example, it should be noted that although dependent claims refer back in the claims to a specific combination with one or more other claims, other examples also comprise a combination of dependent claims with the subject matter of any other dependent claim or a combination of each feature with other dependent or independent claims. Such combinations shall be encompassed, unless an explanation is given that a specific combination is not intended. Furthermore, the intention is for a combination of features of a claim with any other independent claim also to be encompassed, even if this claim is not directly dependently on the independent claim.

The examples described above are merely illustrative for the principles of the present disclosure. It should be understood that modifications and variations of the arrangements and of the details described are obvious to those skilled in the art. Therefore, the intention is for the disclosure to be limited only by the appended patent claims and not by the specific details set out for the purpose of the description and explanation of the examples.

Although specific exemplary embodiments have been illustrated and described herein, it will be apparent to a person skilled in the art that a multiplicity of alternative and/or equivalent implementations can be substituted for the specific exemplary embodiments shown and illustrated there, without departing from the subject matter of the present application. This application text is intended to cover all adaptations and variations of the specific exemplary embodiments discussed and described herein. Therefore, the present subject matter of the application is limited only by the wording of the claims and the equivalent embodiments thereof.

What is claimed is:

1. A method for producing a nanofilm, the method comprising:
   providing a microsieve having a first and a second opposite surface region, wherein micropores are formed extending through the first and second surface regions;
   applying a nanomaterial suspension on the first surface region of the microsieve, wherein the nanomaterial suspension comprises nanomaterial particles; and
   creating a pressure difference at a plurality of the micropores between the first and second surface region of the microsieve in order to move the nanomaterial suspension into the micropores and/or through the micropores, such that the nanomaterial particles adhere to the first surface region and to wall regions of the micropores and form the nanofilm,
   wherein the nanofilm comprises a self-supporting horizontal portion spanning the micropores.

2. The method as claimed in claim 1, wherein the nanomaterial suspension is moved by the pressure difference into the micropores, which are mechanically connected to one another by webs, in order to form the nanofilm furthermore regionally in the micropores and in a manner spanning the micropores between the webs and on the webs at the microsieve.

3. The method as claimed in claim 1, wherein the pressure difference exerted between the first and second surface regions of the microsieve is exerted uniformly on the plurality of micropores of the microsieve.

4. The method as claimed in claim 1, wherein the nanomaterial suspension comprises a solvent having the nanomaterial particles, the method further comprising heating the nanofilm adhering to the microsieve in order to densify the nanofilm and/or to remove residual solvent of the applied nanomaterial suspension.

5. The method as claimed in claim 1, wherein the microsieve is formed as a substrate having micropores arranged therein, and wherein the substrate has an edge region surrounding the micropores formed in the substrate.

6. The method as claimed in claim 1, wherein the microsieve is integrated in a semiconductor wafer in order to produce the nanofilm at the wafer level.

7. The method as claimed in claim 1, wherein the microsieve has a pore diameter of 0.1 to 20 μm and a pore length of 200 to 2000 nm, and wherein the nanomaterial particles have an average lateral extent of 0.1 to 50 μm.

8. The method as claimed in claim 1, wherein the nanomaterial particles are formed as nanomaterial platelets or nanomaterial flakes, and wherein the nanomaterial particles have an average lateral extent of 0.1 to 50 μm.

9. The method as claimed in claim 1, wherein the nanomaterial particles comprise carbon to form a carbon nanofilm or a graphene nanofilm.

10. The method as claimed in claim 1, wherein the micropores are mechanically connected to one another by webs, wherein the nanofilm further comprises nanopores in regions spanning the micropores, in order to form a nanosieve having the nanopores.

11. The method as claimed claim 1, wherein creating a pressure difference comprises exerting a reduced pressure on a plurality of the micropores at the second surface region of the microsieve in order to draw the nanomaterial suspension into the micropores and/or through the micropores, such that the nanomaterial particles adhere to the first surface region and to wall regions of the micropores and form the nanofilm.

12. The method as claimed in claim 1, wherein creating a pressure difference comprises exerting an excess pressure on a plurality of the micropores at the first surface region of the microsieve in order to press the nanomaterial suspension into the micropores and/or through the micropores, such that the nanomaterial particles adhere to the first surface region and to wall regions of the micropores and form the nanofilm.

13. A sensor arrangement comprising a nanofilm configured as a sensor element, wherein the nanofilm comprises:
a microsieve having a first and a second opposite surface region, wherein micropores are formed extending through the first and second surface regions; and
a nanomaterial suspension on the first surface region of the microsieve, wherein the nanomaterial suspension comprises nanomaterial particles,
wherein the nanofilm is configured for creating a pressure difference at a plurality of the micropores between the first and second surface region of the microsieve in order to move the nanomaterial suspension into the micropores and/or through the micropores, such that the nanomaterial particles adhere to the first surface region and to wall regions of the micropores and form the nanofilm, wherein the nanofilm comprises a self-supporting horizontal portion spanning the micropores, and wherein the nanofilm is configured for detecting a measurement variable.

14. The sensor arrangement as claimed in claim 13, wherein the nanofilm is electrically conductive and is configured such that at least regional deformation of the nanofilm brings about a change in an electrical property of the nanofilm.

15. The sensor arrangement as claimed in claim 13, wherein the nanofilm is configured in a manner spanning the micropores between webs of the microsieve, wherein a deflection of the microsieve with the nanofilm arranged thereon brings about a detectable change in an electrical property of the nanofilm.

16. The sensor arrangement as claimed in claim 13, wherein the micropores are configured in a honeycomb-shaped fashion, wherein the nanofilm is configured as a honeycomb array in a manner spanning the micropores formed in a honeycomb-shaped fashion between webs of the microsieve, and wherein a deflection of one or more nanofilm honeycombs brings about a detectable change in the conductivity of the nanofilm.

17. The sensor arrangement as claimed in claim 13, wherein the nanofilm is configured to adsorb a target substance or a target gas, and wherein a change in an electrical property of the nanofilm is brought about in the event of the target substance or target gas binding to the nanofilm.

18. A nanosieve comprising a nanofilm, wherein the nanofilm comprises:
a microsieve having a first and a second opposite surface region, wherein micropores are formed extending through the first and second surface regions; and
a nanomaterial suspension on the first surface region of the microsieve, wherein the nanomaterial suspension comprises nanomaterial particles,
wherein the nanofilm is configured for creating a pressure difference at a plurality of the micropores between the first and second surface region of the microsieve in order to move the nanomaterial suspension into the micropores and/or through the micropores, such that the nanomaterial particles adhere to the first surface region and to wall regions of the micropores and form the nanofilm, wherein the nanomaterial suspension is moved by the pressure difference into the micropores, which are mechanically connected to one another by webs, in order to form the nanofilm furthermore regionally in the micropores and in a manner spanning the micropores between the webs and on the webs at the microsieve, wherein the nanofilm comprises a self-supporting horizontal portion spanning the micropores, and wherein the nanofilm has nanopores in the regions spanning the webs, in order to form a nanosieve.

* * * * *